United States Patent
Gharbi et al.

(10) Patent No.: US 11,677,796 B2
(45) Date of Patent: Jun. 13, 2023

(54) SYSTEM AND METHOD FOR VIDEO ENCODING OPTIMIZATION AND BROADCASTING

(71) Applicant: Logitech Europe S.A.

(72) Inventors: Eddy Gharbi, San Francisco, CA (US); Khaled Jerbi, Rennes (FR)

(73) Assignee: Logitech Europe S.A., Lausanne (CH)

( * ) Notice: Subject to any disclaimer, the term of this patent is extended or adjusted under 35 U.S.C. 154(b) by 61 days.

(21) Appl. No.: 16/013,308

(22) Filed: Jun. 20, 2018

(65) Prior Publication Data

US 2019/0394253 A1     Dec. 26, 2019

(51) Int. Cl.
| | |
|---|---|
| *H04L 65/70* | (2022.01) |
| *H04N 21/234* | (2011.01) |
| *H04N 21/25* | (2011.01) |
| *H04L 65/65* | (2022.01) |
| *H04L 65/75* | (2022.01) |

(52) U.S. Cl.
CPC .............. *H04L 65/70* (2022.05); *H04L 65/65* (2022.05); *H04L 65/75* (2022.05); *H04N 21/234* (2013.01); *H04N 21/25* (2013.01)

(58) Field of Classification Search
CPC ... H04L 65/607; H04L 65/601; H04L 65/608; H04L 65/4076; H04L 65/80; H04L 65/70; H04L 65/65; H04L 65/75; H04L 65/611; H04N 21/234; H04N 21/25; H04N 21/23805; H04N 21/2402; H04N 21/25833; A63F 13/355; A63F 13/86
See application file for complete search history.

(56) References Cited

U.S. PATENT DOCUMENTS

| | | | |
|---|---|---|---|
| 7,640,106 B1 | 12/2009 | Stokar et al. | |
| 8,514,933 B2 * | 8/2013 | Liang | H04N 19/172 375/240.03 |
| 8,767,825 B1 * | 7/2014 | Wang | H04N 19/172 375/240.1 |
| 10,996,742 B2 | 5/2021 | Connellan et al. | |
| 2006/0210191 A1 * | 9/2006 | Silverstein | G06T 5/005 382/275 |

(Continued)

OTHER PUBLICATIONS

International Search Report and Written Opinion issued in International Application No. PCT/US2019/038118 dated Sep. 13, 2019, 6 pages.

(Continued)

*Primary Examiner* — Chris Parry
*Assistant Examiner* — Dixon F Dabipi
(74) *Attorney, Agent, or Firm* — Kilpatrick Townsend & Stockton LLP (57) ABSTRACT

This present disclosure describes a system and methods for encoding optimization in streaming multimedia. At least one method includes training an optimization engine to discover the optimal encoding settings for a specific type of content; a user playing video games or content on a computer, using streaming software to combine all or part of their computer session with their local camera feed, the streaming software retrieving a graphical overlay for insertion into the video, the streaming software encoding the video using encoder settings optimized to the video game or content being played, and the streaming software publishing the encoded video to one or more streaming services for viewers to consume.

21 Claims, 9 Drawing Sheets

(56) References Cited

U.S. PATENT DOCUMENTS

| | | | |
|---|---|---|---|
| 2011/0285704 | A1 | 11/2011 | Takeda et al. |
| 2012/0265847 | A1* | 10/2012 | Swenson ............ H04L 67/2823 709/217 |
| 2012/0317299 | A1 | 12/2012 | Sathianathan et al. |
| 2013/0166580 | A1* | 6/2013 | Maharajh ............. H04L 65/605 707/758 |
| 2014/0044197 | A1* | 2/2014 | Liao ................ H04N 21/23418 375/240.26 |
| 2015/0350703 | A1 | 12/2015 | Rynderman et al. |
| 2016/0037176 | A1* | 2/2016 | Chari ............... H04N 21/23439 375/240.26 |
| 2016/0334884 | A1 | 11/2016 | Solomon et al. |
| 2018/0053056 | A1 | 2/2018 | Rabinovich et al. |
| 2018/0176508 | A1* | 6/2018 | Pell .................... H04L 65/4015 |
| 2019/0068946 | A1* | 2/2019 | Stockhammer .. H04N 21/21805 |
| 2019/0335192 | A1* | 10/2019 | Otto ....................... G06N 20/10 |
| 2019/0373040 | A1* | 12/2019 | Grubbs .............. H04L 65/4084 |
| 2020/0127940 | A1* | 4/2020 | Lopez Fernandez ....................... H04L 47/801 |

OTHER PUBLICATIONS

Final Office Action for U.S. Appl. No. 16/163,346, dated Aug. 25, 2020, 11 pages.
Non-Final Office Action for U.S. Appl. No. 16/163,346, dated Feb. 12, 2020, 13 pages.
International Search Report and Written Opinion for PCT/US2019/038118, dated Sep. 13, 2019, 7 pages.
Notice of Allowance for U.S. Appl. No. 16/163,346, dated Dec. 28, 2020, 13 pages.

\* cited by examiner

SYSTEM AND METHOD FOR VIDEO ENCODING OPTIMIZATION AND BROADCASTING

FIELD OF DISCLOSURE

This present disclosure relates to a system and methods for encoding optimization of streaming multimedia.

BACKGROUND

The online video industry has grown rapidly since YouTube made it simple to share online videos in 2005. Netflix introduced its streaming video service in 2007, followed by Hulu in 2008. All three services focused on pre-recorded video, also known as Video On Demand ("VOD"), until YouTube introduced YouTube Live in 2008. It marked the first easily accessible implementation of a live streaming video service.

Similarly, video games have evolved from single or multiplayer experiences shared around a single TV to complicated, internet-based multiplayer games that allow hundreds of thousands of players to participate in shared gaming experiences. Fans of video games historically used magazines such as GamePro Magazine to stay abreast of new game releases, uncover otherwise difficult to find game secrets, and to learn how optimize their gameplay. Eventually the medium was replaced by YouTube channels dedicated to video game content.

The popularity of online video game content lead to the founding of a new class of Streaming Services: Twitch, which was founded in 2011, and YouTube Gaming which came online in 2015. These services allowed players to directly broadcast their own gaming experiences to the world. Streaming Services differ from the aforementioned Netflix, Hulu, and YouTube products in that they focus on streaming live video, as opposed to pre-recorded VOD content. Today Twitch serves over 170 million visitors every month, and unlike YouTube's VOD product, which primarily serves short-form video, the average Twitch visitor views over an hour of streaming content. For the purpose of the present invention, the term Streaming Services refers to one or more services designed to stream live video content via a digital channel including, but not limited to, Twitch, YouTube Gaming, Mixer, and Facebook Live.

These extended viewing times are enabled by video game fans' voracious appetite for video game content, and by Streaming Services such as Twitch or YouTube Gaming providing tools to enable users broadcasting their games, the Streamers, to monetize the time they spend streaming their game sessions. These tools include allowing Viewers to sign up for a monthly subscription to the channel of a specific Streamers whose personality or gameplay they enjoy, a chat panel for viewers to chat with each other and the Streamer, and an extensive application programming interface (API) for developers to build applications that interface with the Streaming Services. Many Streamers are able to make a substantial living through Streaming Services and the ecosystems they have created.

Due to the instantaneous and live nature of video streamed to Streaming Services, it is not possible to edit a video before it goes live using traditional video editing software. To overcome this limitation broadcasting software, such as Open Broadcaster Software ("OBS"), has introduced the ability to use Overlays, which are graphical elements that are added to the Streamer's video immediately prior to the video being encoded and sent to Streaming Services for Viewer consumption. Overlays can consist of static or dynamic images, and they can be stored locally or hosted on a server.

Furthermore, Streaming Services and Streaming Service APIs have enabled an ecosystem of third-party tools that help Streamers monetize their channels beyond Viewer subscriptions. Key features developed by third-party services include facilitating donations (a primary source of income for Streamers), Multistream Services that broadcast a single Streamer's video feed to multiple simultaneous Streaming Services, chatbots that help Streamers engage with and manage their Viewers through the chat pane, and custom Overlays. Said custom Overlays can provide static images, such as decorative video borders, animated graphics that respond in real time to the actions of the Viewers or the game.

An example of a real-time alert includes an animated alert appearing in the Streamer's video feed when a Viewer subscribes, follows, or donates to the Streamer. This allows the Streamer to easily see Viewer monetization events as they occur. It also gives the Viewer a chance at notoriety as their name is displayed in front of potentially millions of other Viewers.

Another example of a real-time alert is a widget system that allows the Streamer to display the chat pane contents directly within the video feed. This allows the Streamer to monitor both the output of their live stream and their Viewer conversations in one place, without having to manually show and hide the chat panel while they are live. These and other alert examples have become integral to the success of Streaming Services, and Viewers have come to expect them from their favorite Streamers.

Another consideration is that Streamers are incentivized to stream as often as possible, with many working full-time hours. Given that an hour of streaming HD video consumes approximately 660 Megabytes per Hour, we can estimate that the average Streamer working full-time hours will use at least 100 Gigabytes of data per month when streaming. Considering many ISPs cap the amount of data a user can use before incurring additional charges, it becomes clear that utilization has to be considered in order for Streamers to reach their fullest earning potential.

Video Encoding is the single most important factor in determining how much bandwidth a stream will use, the quality of video ultimately seen by Viewers, and how much CPU and GPU is utilized to produce the desired output. While Video Encoding as a subject encompasses the complex relationships between quality, latency, bandwidth, video file compression (e.g., encoding), video file decompression (e.g., decoding), data loss, and the amount of data used to represent video (e.g., bitrate), this invention is mostly concerned with optimizing bitrate, video quality, bandwidth, and CPU/GPU utilization, though the other factors are never specifically excluded.

At present, most live streaming software implements the H.264 codec standard for encoding live video before it is sent to a Streaming Service. This free software library provides users access to a highly performant, standardized way of encoding videos. It obfuscates a number of video encoding settings through seven default encoding Presets, which represents a collection of video encoder settings, which were originally designed to address encoding needs for different media types. For example, the Baseline Preset was originally intended for video conferencing uses, which does not require ability to rewind video, while the High Preset was adopted for high definition streaming purposes, such as HD-DVD or BluRay. While H.264 is the focus of this invention, these concepts almost universally apply to other codec standards.

These presets combine a complicated array of underlying settings and features, ranging from different types of compression for balancing output quality against file size to tracking specific images in the final video file, which permits fast-forwarding and rewinding in streaming media.

Most streaming software chooses one of the aforementioned default Presets while providing video engineers with access to a number of settings that affect the bitrate and video quality. While users are rarely provided access to the individual settings that comprise a preset, they are sometimes allowed to choose which preset they use for a given codec. While providing users with Preset options can be appropriate in some software applications, for most end users, the time spent learning, configuring, and testing a Video Encoder to find optimal settings would be better served bringing in revenue by actively streaming.

As mentioned, the default Presets are designed to apply universally. This allowed the online video streaming industry to proliferate, however the focus on standardization sometimes came at a cost of potential content-specific optimizations. Companies like Netflix, through their Dynamic Optimizer, have made strides to remedy this in recent years by re-encoding media based on what type of content is presented. For example, a movie with darker tones contains more black-scale pixels, which don't have to be replaced as often as lighter pixels. By tuning encoders to replace pixels less frequently than the standardized Preset might allow for, Netflix is able to decrease the resulting bitrate. Similarly, by tuning an encoder to high-motion movies, such as action movies, the encoder might save processing power needed for encoding by reducing how frequently it attempts to carry similar pixels from one frame to the next. In the two aforementioned examples, assuming videos with similar length, the former video will result in a smaller file size and bitrate than the latter, but by knowing what to expect ahead of time Netflix is able to dramatically optimize their costs to produce the output video file.

In the Netflix example, users rate the output quality of the video, and an optimization engine combines the user ratings with metadata around the user experience, such as, for example, bitrate, user bandwidth, location, and typical rating habits, to decide whether or not a video's encoding is optimized to its fullest potential. If it is not fully optimized, the encoding engine attempts to re-encode the video by tuning the encoder's low-level settings, then it repeats the cycle of gaining user feedback and optimizing based on the results. Netflix reports that Dynamic Optimizer has reduced the company's bandwidth utilization and storage space by up to 19 percent.

It has already been established that Streamers stand to benefit from optimizing their encoders. Given that the same game played by two different Streamers on two computers will have a very similar look and feel, it makes sense that both Streamers could use the same optimized encoder settings to broadcast their game. While Netflix's Dynamic Optimizer method works exceedingly well for pre-recorded media, the approach has to be reconsidered in order to work with a live streaming scenario, such as when broadcasting a computing session to one or more Streaming Services. Additionally, while live streaming software designed for end-users broadcasting their session to Streaming Services might allow a Streamer to change the preset used by their video encoder, said Streamers would require significant technical know-how and expertise to optimize individual settings for the encoder. Thus, there are currently no viable options for Streamers to optimize their video streams based on the content type.

SUMMARY

Presently disclosed is a system and methods for video encoder optimization. In embodiments, the method includes a system for training an optimization engine; the optimization engine being configured to read a training set of video files and related metadata, said metadata identifying the input category of the video files; said metadata provided either via manual input from the optimization engine operator or from an associated metadata file; the optimization engine being configured to read the bitrate and related technical metrics about the encoded video files; the optimization engine being configured to optimize the video encoder by solving for a custom encoder preset as specified by the optimization engine operator, said calculated optimization settings relating to a specific encoder preset, said calculated optimization settings being stored to a machine-readable format; the calculated optimization settings being labeled as related to the input categories of the video files; the optimization engine being configured to read a test set of video files and related metadata; the optimization engine being configured to apply the optimized encoder settings to the test data and display results for review by the optimization engine operator; the optimization engine being configured to receive quality rating input from the optimization engine operator; the optimization engine being configured to incorporate the optimization engine operator's feedback into the optimization calculations until ideal optimization is achieved; broadcasting software operated by a second user; the second user manually identifying the specified input category of the video file; the second user selecting the encoder preset; the local broadcast software loading the encoder configuration for the specified input category and the second user's chosen encoder preset; the local broadcast software encoding video output from the second user's computer session to produce a video file; uploading the encoded video file to a streaming service; the streaming service decoding the video file; the streaming service displaying the video file for consumption by a plurality of users.

In some embodiments, the metadata includes encoder configuration settings.

In some embodiments, the specified input category refers to the name of a video game.

In some embodiments, the specified input category refers to the genre of a video game.

In some embodiments, the specified input category refers to a physical activity, such as, but not limited to, painting.

In some embodiments, the local broadcast software retrieves a graphical overlay from a server, which is then inserted into the video prior to encoding.

In some embodiments, the video output includes both the second user's local computer session and a local camera feed.

In some embodiments, the optimization engine calculates the optimal CPU usage, bitrate, and video quality metrics of the encoded video file to optimize the video encoder for the specified input category.

In some embodiments, the metric used to measure video quality is a standardized model such as, but not limited to, PSNR, SSIM, or VMAF.

In some embodiments, the optimization engine automatically generates the optimized encoding settings for the encoder presets by using algorithmically-generated quality metrics and/or video quality measurement frameworks, such as, but not limited to, PSNR, SSIM, or VMAF for the quality rating input instead of manual input from the optimization engine operator.

In some embodiments, the custom encoder preset includes optimizing the video encoder to minimize CPU utilization while encoding the specified input category.

In some embodiments, the custom encoder preset includes optimizing the video encoder to maximize video quality while encoding the specified input category.

In some embodiments, the custom encoder preset includes optimizing the video encoder to almost equally balance video quality and CPU utilization while encoding the specified input content.

In some embodiments, the optimization engine automatically solves for each predefined custom encoder preset.

In some embodiments, the encoder output is customized to accommodate the user's computing hardware capabilities.

In some embodiments, the optimization engine requires the training of a machine learning algorithm, including, but not limited to, a support vector machine, a decision tree, or a random forest algorithm.

In some embodiments, the optimization engine requires the training of a deep learning algorithm, such as, but not limited to, a convolutional neural network.

In some embodiments, the system incorporates a content identification engine trained to automatically detect the input category and generate the associated metadata identifying the input category of the video; said system reads pre-recorded video files and associated metadata to learn to identify the input category, then when the second user begins capturing their computing session, a detection engine automatically identifies the input category, which is then combined with the user's preset preference to load the correct previously-generated encoding optimization settings.

In some embodiments, the content-optimized encoding occurs after a video file is received by a multistreaming service and prior to transmitting the file to one or more streaming services.

In some embodiments, the content-optimized encoding occurs after a video file is received by a streaming service.

BRIEF DESCRIPTION OF THE DRAWINGS

A better understanding of the various disclosed embodiments can be obtained when the following detailed description is considered in conjunction with the attached drawings, in which:

FIGS. 5A and 5B shows a process flowchart of a user training the content identification engine It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Web Infrastructure

Figure 1A:
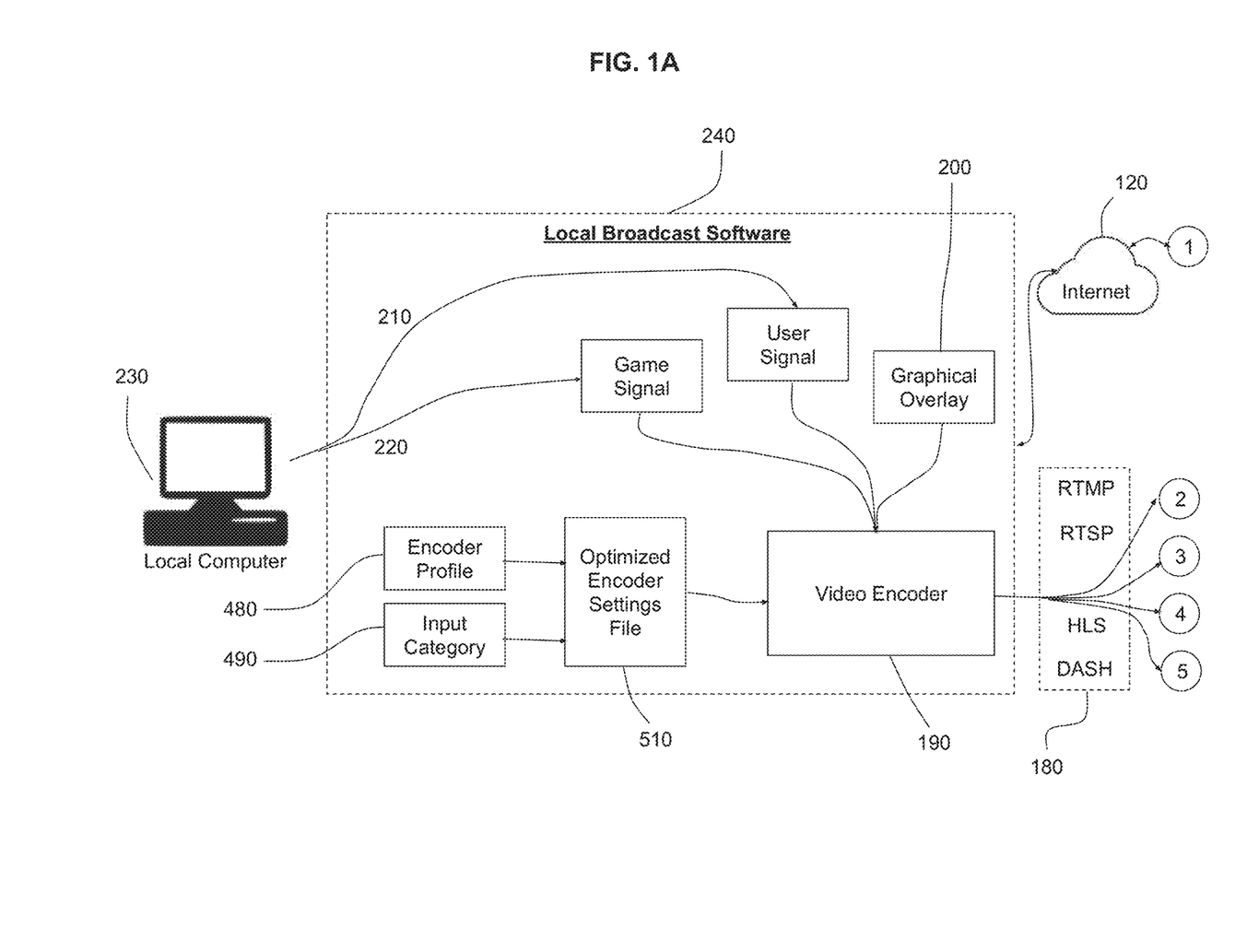
FIGS. 1A and 1B shows a system diagram that includes an illustrative web infrastructure using optimized encoder settings prior to encoding and broadcasting
Figure 1B:
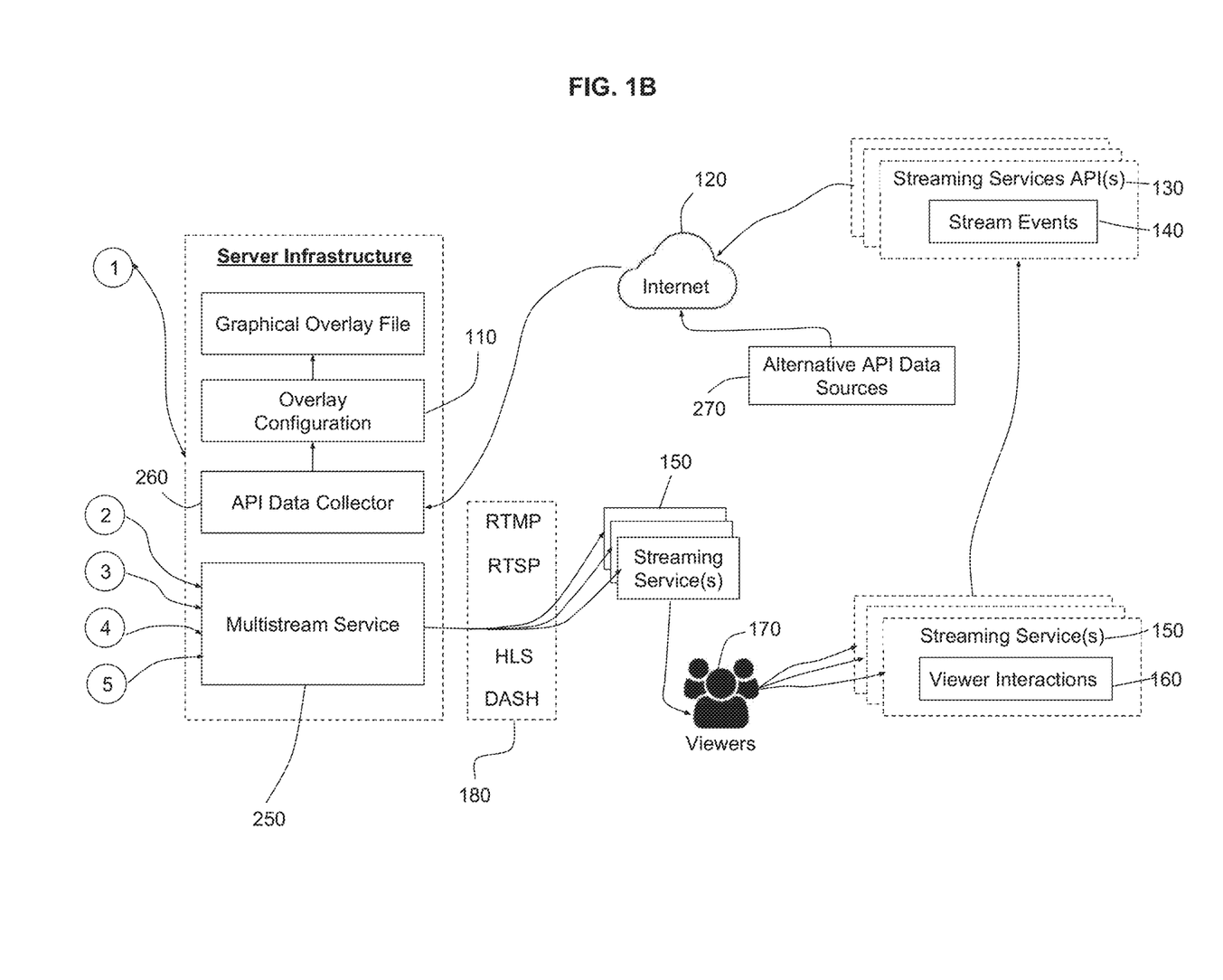

FIGS. 1A and 1B show an overview of an illustrative embodiment of a web infrastructure with multiple data sources and multistream infrastructure that includes the Server Infrastructure 100, an Internet Infrastructure 120, a Local computer 230, operating Local Broadcast Software 240, a Multistream Service 250, a Streaming Service 150, Viewers 170, a method for collecting Viewer Interaction 160, and one or more Streaming Service API(s) 130. The Server Infrastructure 100 contains a method for persistent storage, such as database, as well as a method for initiating and responding to internet requests, such as a web server. The Server Infrastructure 100 stores and makes various user settings available for retrieval, including the user's Overlay Configuration 110 and the user's Graphical Overlay 200. This embodiment potentially includes Alternative API Data Sources 270, which are data sources unrelated to the Streaming Service API(s) 130 that are used in the creation of the Graphical Overlay 200. This embodiment of the Server Infrastructure 100 contains the Multistream Service 250, which stores and maintains the user's connections to third-party Streaming Service 150. This embodiment of the Server Infrastructure 100 also contains an API Data Collector 260, which is responsible for aggregating data from one or more Streaming Service API(s) 130 and Alternative API data Sources 270. Data gathered by the API Data Collector 260 is then used in combination with the user's Overlay Configuration 110 to populate the Graphical Overlay 200.

The Local Computer 230 may be a traditional desktop computer. a laptop, a mobile phone, a virtual or augmented reality computing device, or any related personal computing device. The Streaming Service API(s) 130 and the Alternative API Data Sources 270 connection(s) may be unidirectional or bilateral. The Streaming Service API(s) 130 and the Alternative API Data Sources 270 may also be a RESTful service, a persistent websockets connection, or any other method of regularly publishing and sharing information between disparate internet systems. The Game Signal 220 includes, but is not limited to, an audio/video signal from a video game, a specific application unrelated to a video game, or the user's operating system environment including some or all applications the user has executed. Multiple Game Signals 220 and User Signals 210 may also be combined to create the Game Signal 220 or User Signal 210.

In the embodiment shown, the Server Infrastructure 100 responds to requests from the Local Broadcast Software 240 executing on the Local Computer 230, and further retrieves the Overlay Configuration 110 as needed. The Local Software may be stored on a non-volatile information medium, or it may be downloaded onto the Local Computer 230 via, e.g., the Internet 120.

The core functionalities of the Server Infrastructure 100 include, but are not limited to:

1. Responding to requests from the Local Broadcast Software 240, Local computer 230, or Streaming Service API 130;
2. Hosting a web page that allows users to edit their Overlay Configuration 110;
3. Executing the API Data Collector 260, which may perform, but is not limited to. be following actions:
   a Maintains persistent connections with the Streaming Service API(s) 230;

b Receives data from Alternative API Data Sources 270;

c Stores metadata about the data received from the Streaming Service API(s) 230 and Alternative API Data Sources 270;

d Stores data aggregated from one or more source related to the user in the user's account;

4. Generating the Graphical Overlay 200 based on the user's Overlay Configuration 110 at set intervals, based on specific data events as they are received in real time by the API Data Collector 260, upon request, or otherwise as needed;
5. Maintaining user account information;
6. Hosting the Multistream Service 250; and
7. Hosting and websites required to support the disclosed system.

The core functionalities of the Local Broadcast Software 240 include, but are not limited to:
1. Receiving a Game Signal 220 and, optionally, a User Signal 210 from the Local computer 230.
2. Using the Internet 120 to retrieve the Graphical Overlay 200 from the Server Infrastructure 100;
3. Using the Video Encoder 190 to produce a video file from the Game Signal 220, the optional User Signal 210, and the Graphical Overlay 200;
4. Sending authentication information to the Streaming Service 150 to identify the user uploading the video file;
5. Uploading the video file to a Multistream Service 250 using Streaming Protocols 180;
6. Storing user settings related to, but not limited to:
   a Streaming Services 150 the user may broadcast their encoded video file;
   b Encoding settings used to configure and optimize the Video Encoder 190; and
   c Streaming settings used to configure and optimize the Streaming Protocols 180 used to upload the video file to Streaming Service 150.

The core functionalities of the Multistream Service 250 include, but are not limited to:
1. Storing user configuration settings to control which Streaming Service(s) 150 an uploaded video file should be redistributed to;
2. Optionally receiving authentication information from the Local Broadcast Software 240;
3. If authentication information is received, forwarding said authentication information to one or more Streaming Services 150;
4. Receiving the uploaded video file from the Local Broadcast Service 240 via a Streaming Protocol 180;
5. Optionally decoding the video file, then re-encoding the file to optimize it for individual Streaming Service(s) 150; or
6. Uploading the video file to one or more Streaming Service 150 using a Streaming Protocol 180.

The core functionalities of each of the Streaming Service(s) 150 include. but are not limited to:
1. Storing account details for the user;
2. Receiving authentication information from the Local Broadcast Software 240 and/or the Multistream Service 250;
3. Using the authentication information to identify the user uploading the video file;
4. Receiving the uploaded video file from the Multistream Service 250 via a Streaming Protocol 180;
5. Decoding the video file;
6. Playing the decoded video file for Viewers 170 to consume on the user's channel;
7. Gathering metadata about Viewer Interactions 160 including, but not limited to:
   a. The type of interaction;
   b. The time of the interaction;
   c. The Viewer's 170 account details; and
8. Storing Viewer Interactions 160 for retrieval by the Streaming Service API(s) 140.

The core functionalities of the Streaming Service API(s) 130 include, but are not limited to:
1. Retrieving Viewer Interactions 160 for processing;
2. Processing Viewer Interactions 160 into Stream Events 140 formatted for use in the Streaming Service API(s) 130;
3. Sending the Stream Events 140 to the API Data Collector 260 via the Streaming Service API(s) 130.

The primary implementations of the Alternative API Data Sources 270 include, but are not limited to:
1. Data received directly from the video game;
2. Data received from a computer vision and/or an artificial intelligence engine analysis of the game;
3. Data received from third-party APIs related to the user's game, the user, or the Viewers 170.

Optimization of a Video Encoder

Figure 2A:
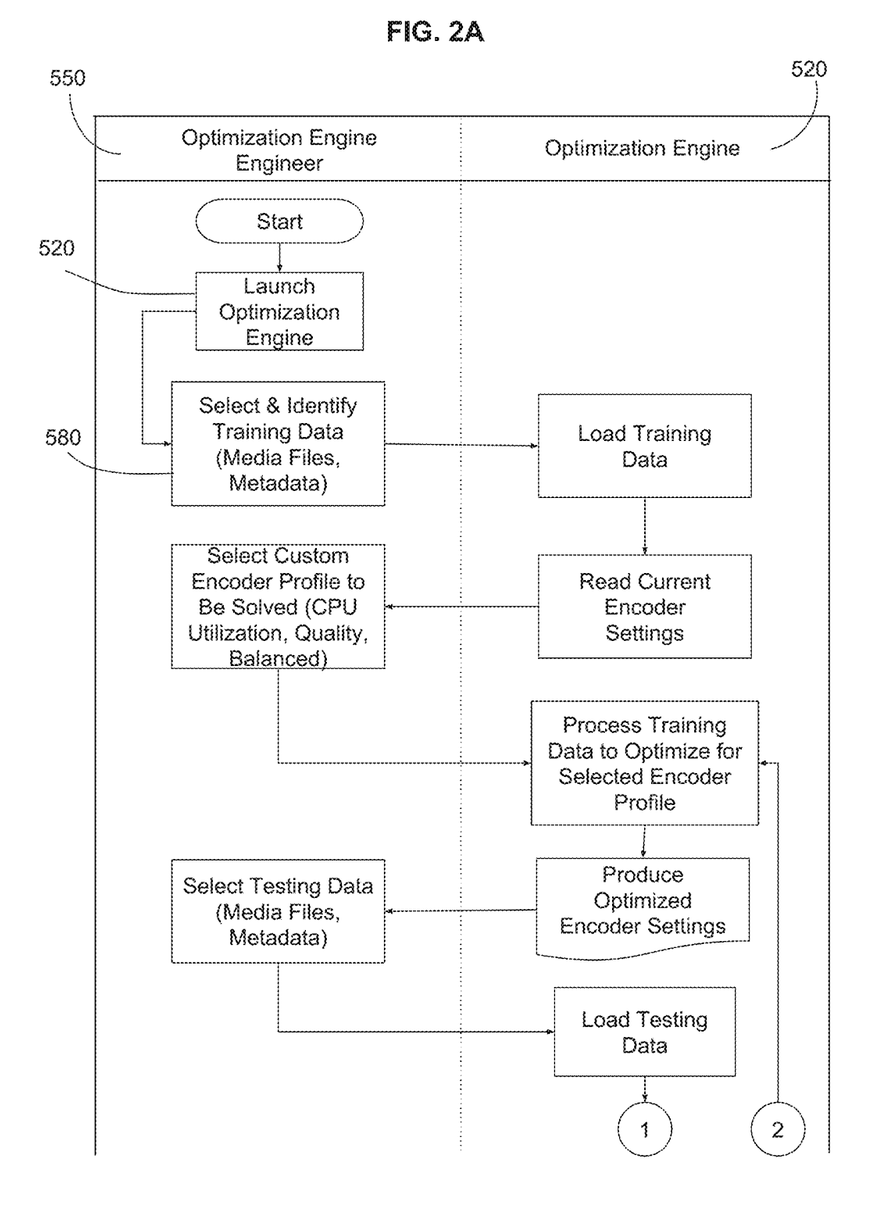
FIGS. 2A and 2B shows a process flowchart of the optimization engine (OE) being trained to produce optimized encoder settings file
Figure 2B:
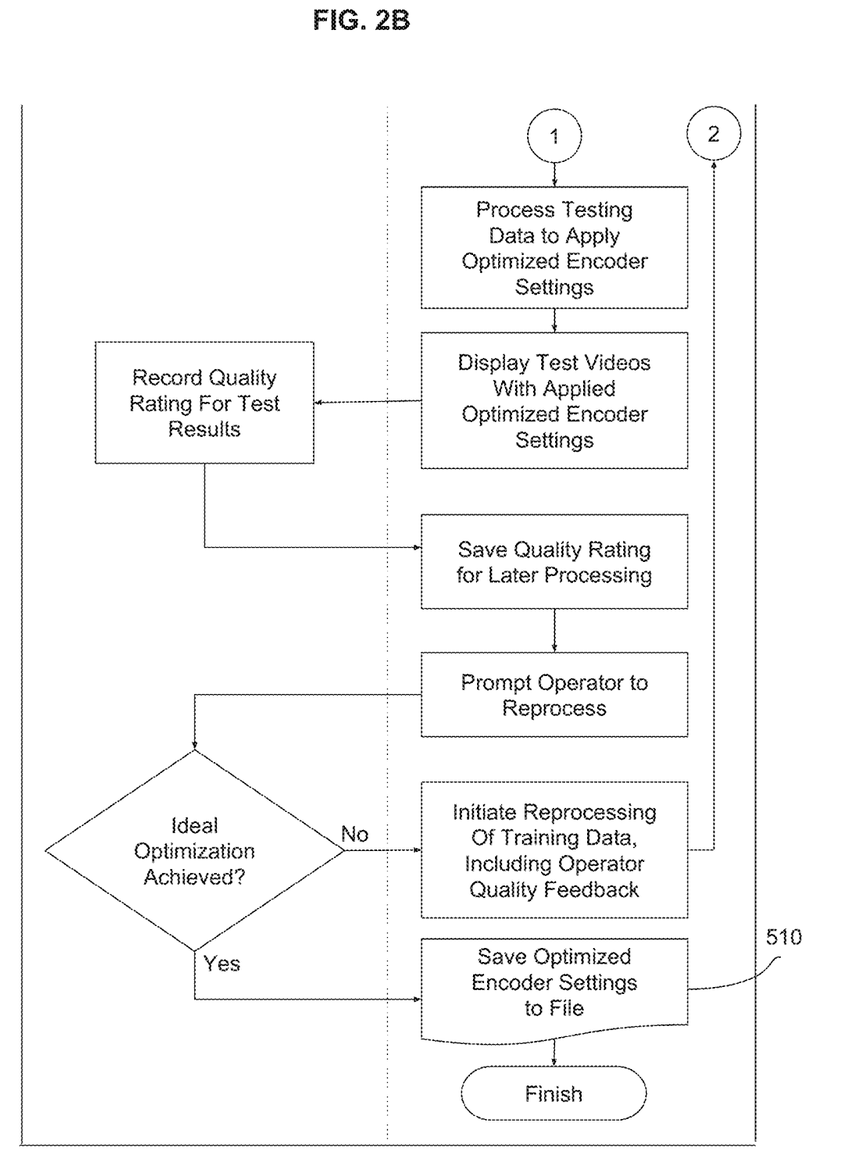

FIGS. 2A and 2B show a process flowchart for the optimization of a video encoder. Here the video content includes one or more of gameplay of a game, a live video broadcast, a replay of a prerecorded video, and/or an instant messaging chat. Moreover, activity type specifies one or more genres of the game, one or more genres of the live video broadcast, a service provider of the live video broadcast, one or more genres of the replay of the prerecorded video, and/or a service provider of the instant messaging chat. The setting for a video encoder includes a first setting defining a frequency in which a pixel from a frame of the video content is carried into the next frame, a second setting defining a resolution, a third setting defining an aspect ratio, a fourth setting defining a framerate, and/or a fifth setting defining a video coding standard. In the present embodiment, determination of the encoding profile for the video content is based on the activity type of the video content and user information of the computing platform, the user information defining the type of computing platform used to encode the video content and an Internet connection speed of the computing platform. The flowchart describes the functions of video encoder components such as Optimization Engine Engineer 550, Optimization Engine 520, a set of media files and Metadata 580 wherein the media files and Metadata 580 is used to train the Optimization Engine 520. Here an Optimization Engine 520 is used to combine the user ratings with Metadata 580 around the user experience, such as, for example, bitrate, user bandwidth, location, and typical rating habits, to decide whether or not a video's encoding is optimized to its fullest potential. If it is not fully optimized, the encoding engine attempts to re-encode the video by tuning the encoder's low-level settings, then it repeats the cycle of gaining user feedback and optimizing based on the results.

The present invention uses one or more processors to obtain the video information, the video content wherein the video content includes both visual and/or audio contents. The processors also determine the encoding profile of the video content based on the activity type of the content. Here the encoding profile assigned to a particular video content specifies predetermined settings for encoding the video content. The processors are crucial in determining the efficiency profile of the video content and based on the encoding profile assigned by it. The efficiency profile determined by the processors specifies one or more measurement values and used by a user to accept the encoding profile. The processors obtain acceptance of the encoding profile for encoding the video content Presently disclosed is a system and methods for video encoder optimization. In embodiments, an Optimization Engine Engineer 550 starts and launches the Optimization Engine 520 to optimize the video encoder. The video encoder optimization protocol starts with training Optimization Engine 520 using a training set of video files and related Metadata 580 wherein said Metadata 580 identifies the input category of the video files, such as a specific video game or a genre of video games. In some embodiments, the specified input category refers to a physical activity, such as, but not limited to, painting. The Optimization Engine 520 calculates the optimal CPU usage, bitrate, and video quality metrics of the encoded video file to optimize the video encoder for the specified input category. The metric used by the Optimization Engine 520 to measure video quality is a standardized model such as, but not limited to, PSNR, SSIM, or VMAF. In the present embodiment, said Metadata 580 is provided either via manual input from the Optimization Engine Operator 550 or from an associated Metadata file 580. In the present embodiment, the Optimization Engine 520 is configured to read the bitrate and related technical metrics about the encoded video files 580. Moreover, the Optimization Engine 520 being configured to optimize the video encoder by solving for a custom encoder preset as specified by the Optimization Engine Operator 550. The Optimization Engine 520 being configured to optimize the video encoder by solving for a custom encoder preset as specified by the Optimization Engine Operator 550 wherein said calculated optimization settings relating to a specific encoder preset, said calculated optimization settings being stored to a machine-readable format. These machine-readable instructions are processed by a processor to determine a minimum efficiency threshold wherein the minimum efficiency threshold defines a minimum measurement value required for the efficiency profile to be presented to the computing platform. In cases where the measurement values of the efficiency profile do not exceed the minimum efficiency threshold, the processor determines a different encoding profile to encode the video content. In cases where the measurement values of the efficiency profile do exceed the minimum efficiency threshold, the processor present the encoding profile associated with the efficiency profile to the computing platform associated with the user and the option to accept the encoding profile such that the computing platform is enabled to encode the video content according to the encoding profile.

These calculated optimization settings being labeled as related to the input categories of the video files. Once the optimized settings for input category of video files is generated, the Optimization Engine 520 is configured to read a test set of video files and related Metadata 580 in the next round. In this step, the Optimization Engine 520 is configured to apply the optimized encoder settings generated in the previous step to the test data and display results for review by the Optimization Engine Operator 550. The Optimization Engine 520 is configured to receive quality rating input from the Optimization Engine Operator 550 and Optimization Engine 520 is configured to incorporate the Optimization Engine Operator's 550 feedback into the optimization calculations until ideal optimization is achieved. For the purpose of the present embodiment, the Metadata 580 monitored by an Optimization Engine Operator 550 includes, but is not limited to, bitrate, user bandwidth, location, and typical rating habits, to decide whether or not a video's encoding is optimized to its fullest potential. Once the ideal optimization level is achieved, optimized encoder settings are saved in a File 510. The encoded video content is transmitted to an external device; the external device 510 may be configured to broadcast the encoded video content. However, if the ideal level of optimization is not achieved, the Optimization Engine Operator 550 will initiate the reprocessing of training data until the ideal optimization is achieved.

Automatically Determining a Video Quality Metric

Figure 3A:
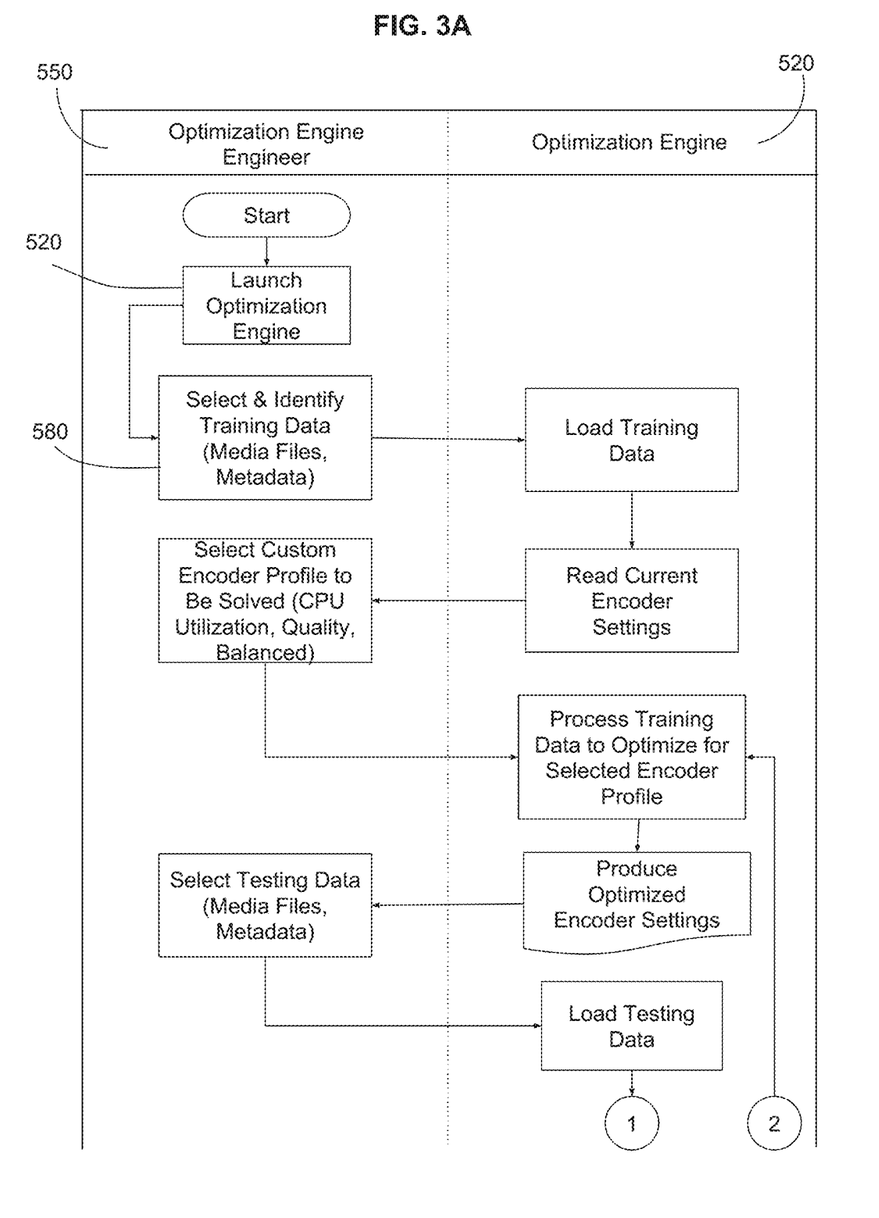
FIGS. 3A and 3B shows a process flowchart of the optimization engine automatically determining the video quality metric during training
Figure 3B:
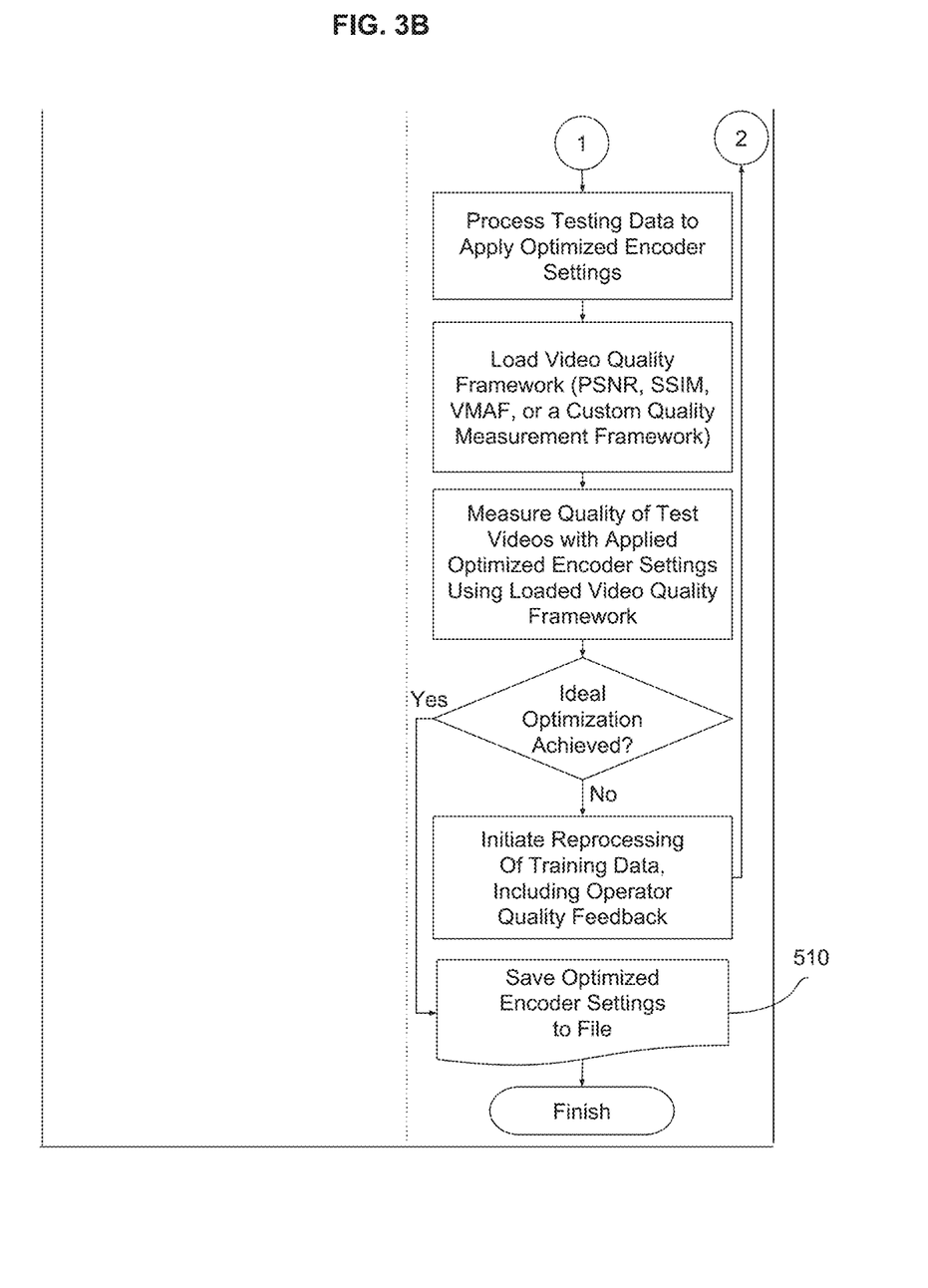

FIGS. 3A and 3B show a process flowchart of the Optimization Engine 520 automatically determining the video quality metric during training. For the purpose of the present embodiment, the video content includes one or more of gameplay of a game, a live video broadcast, a replay of a prerecorded video, and/or an instant messaging chat. Moreover, activity type specifies one or more genres of the game, one or more genres of the live video broadcast, a service provider of the live video broadcast, one or more genres of the replay of the prerecorded video, and/or a service provider of the instant messaging chat. The setting for a video encoder includes a first setting defining a frequency in which a pixel from a frame of the video content is carried into the next frame, a second setting defining a resolution, a third setting defining an aspect ratio, a fourth setting defining a framerate, and/or a fifth setting defining a video coding standard. Here an Optimization Engine 520 is used to combine user ratings with Metadata 580 around the user experience, such as, for example, bitrate, user bandwidth, location, and typical rating habits, to decide whether or not a video's encoding is optimized to its fullest potential.

The flow chart has components such as Optimization Engine Engineer 550, Optimization Engine 520, a set of media files and Metadata 580 wherein the media files and Metadata 580 is used to train the Optimization Engine 520.

The core functions performed by the Optimization Engine 520 are already elaborated in the previous section. The flow chart particularly describes a process wherein the Optimization Engine 520 automatically determines the video quality metric during training. Here, the Optimization Engine 520 is launched, training data is selected and loaded followed by optimization of encoder settings. Once the optimized encoder settings are produced, testing Metadata 580 and media files are loaded and tested using the optimized encoder settings. In the present example, the Optimization Engine 520 automatically generates the optimized encoding settings for the encoder presets by using algorithmically-generated quality metrics and/or video quality measurement frameworks, such as, but not limited to, PSNR, SSIM, or VMAF for the quality rating input instead of manual input from the Optimization Engine Operator 550. Once the ideal optimization level is achieved, optimized encoder settings are saved in File 510. However, if the ideal level of optimization is not achieved, the Optimization Engine 520 is configured to incorporate the Optimization Engine Operator's 550 feedback into the optimization calculations until ideal optimization is achieved.

User Selecting a Preset.

Figure 4:
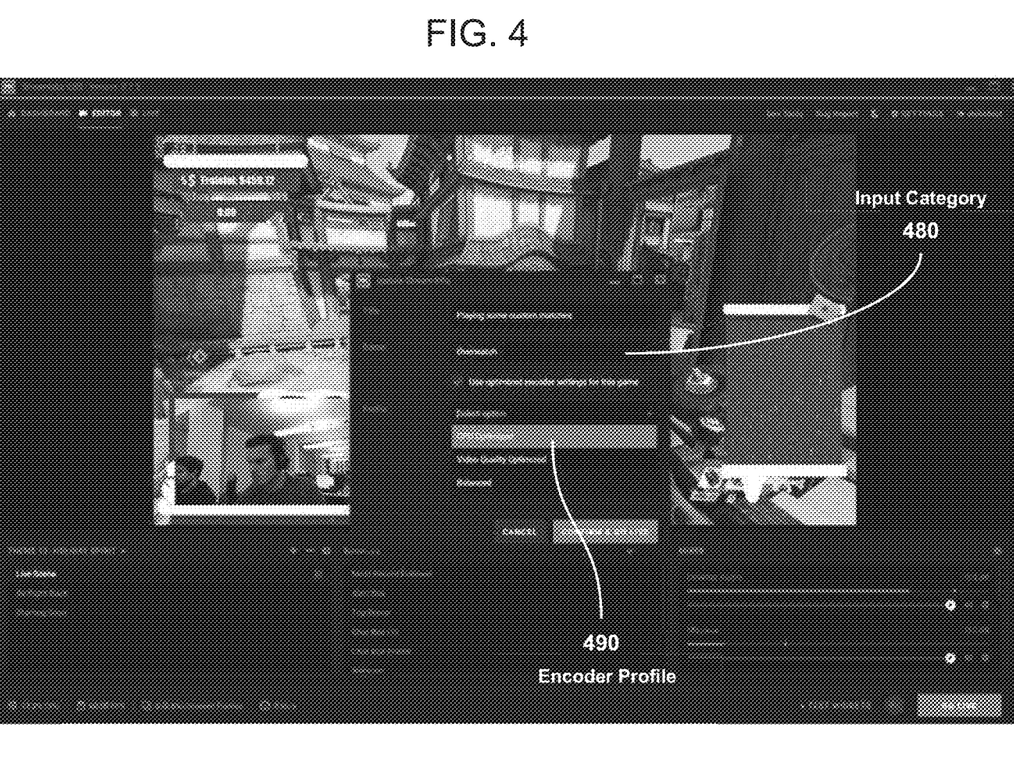
FIG. 4 shows a non-limiting example of a user selecting a preset

FIG. 4 shows a streamer/user operating the broadcasting software by manually identifying the specified Input Category 480 and selecting the Encoder Preset 490. A specified input category includes one or more of gameplay of a game, a live video broadcast, a replay of a prerecorded video, and/or an instant messaging chat. Once the user selects the specified Input Category 480 and the Encoder Preset 490, the Local Broadcast Software 240 encodes a video output based on selected Encoder Preset 490 and produces a video file. Said video file is uploaded to a Streaming Service 150 which decodes and displays it for consumption by a plurality of users. The user then connects one or more third-party streaming service to their account, which is stored in the server infrastructure and accessed via the multistream service. The user then authenticates to the server infrastructure through their Local Broadcast Software 240, which allows the Local Broadcast Software 240 to access services hosted by the Server Infrastructure 100, such as the user's generated overlay image and the aforementioned multistream service. The user then configures Local Broadcast Software 240 to combine two or more separate data sources into an encoded video: a specific application or video game signal; the internet-hosted video overlay, which is generated by the Server Infrastructure 100 at regular intervals to give the appearance that it is animated and synchronized to current events in the application or video game signal; and optionally the user's local camera feed, which, when included, may allow viewers to see the user as they are using their application or playing a video game. The aforementioned signals are then encoded by the Local Broadcast Software 240 for upload to the multistream service; the multistream service then uploads the encoded video to one or more third-party streaming websites, such as Twitch, YouTube Gaming, Mixer, or Facebook Live, based on the user's previously defined connections to said Streaming Service(s) 150.

User Training the Content Identification Engine

Figure 5A:
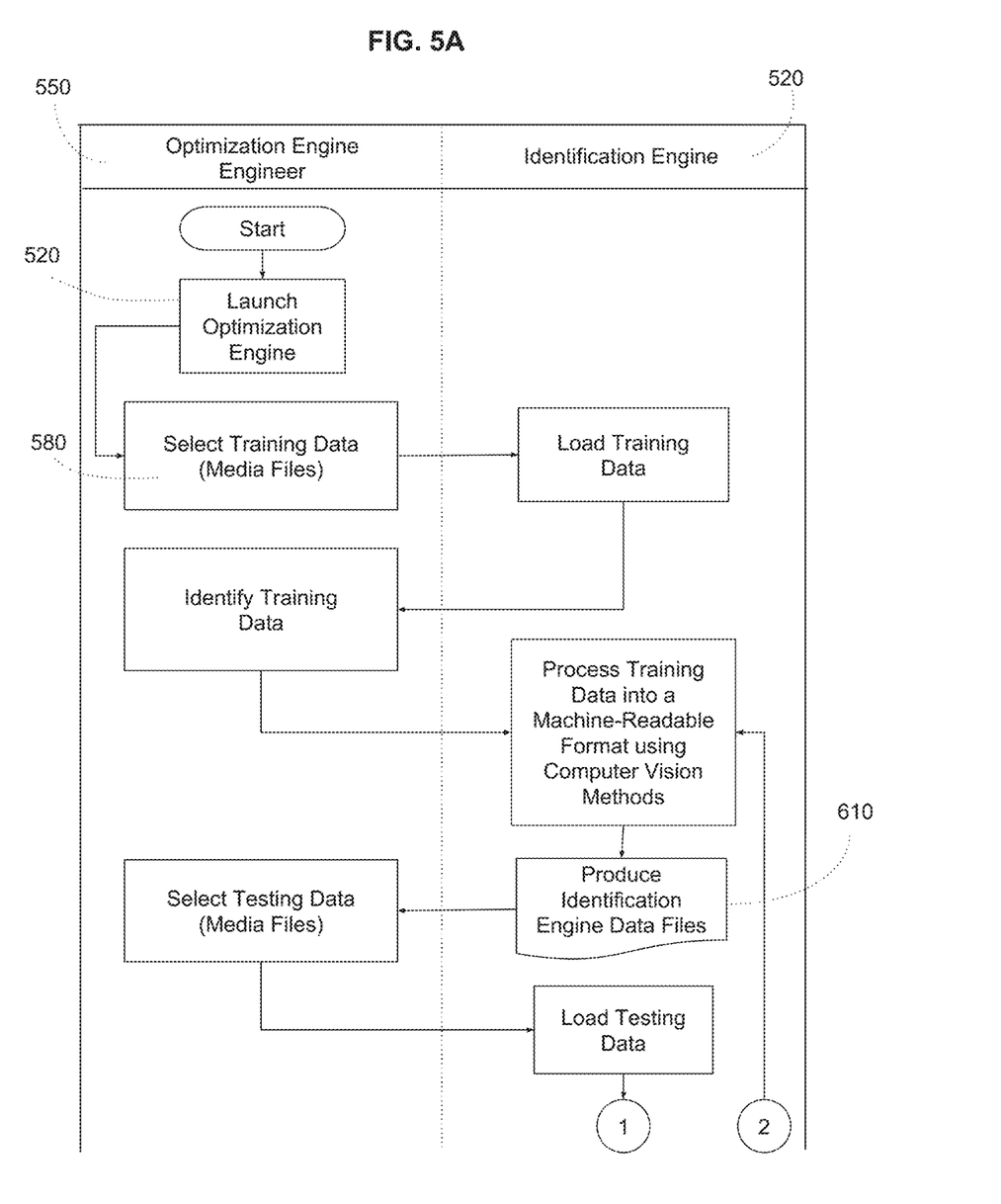
Figure 5B:
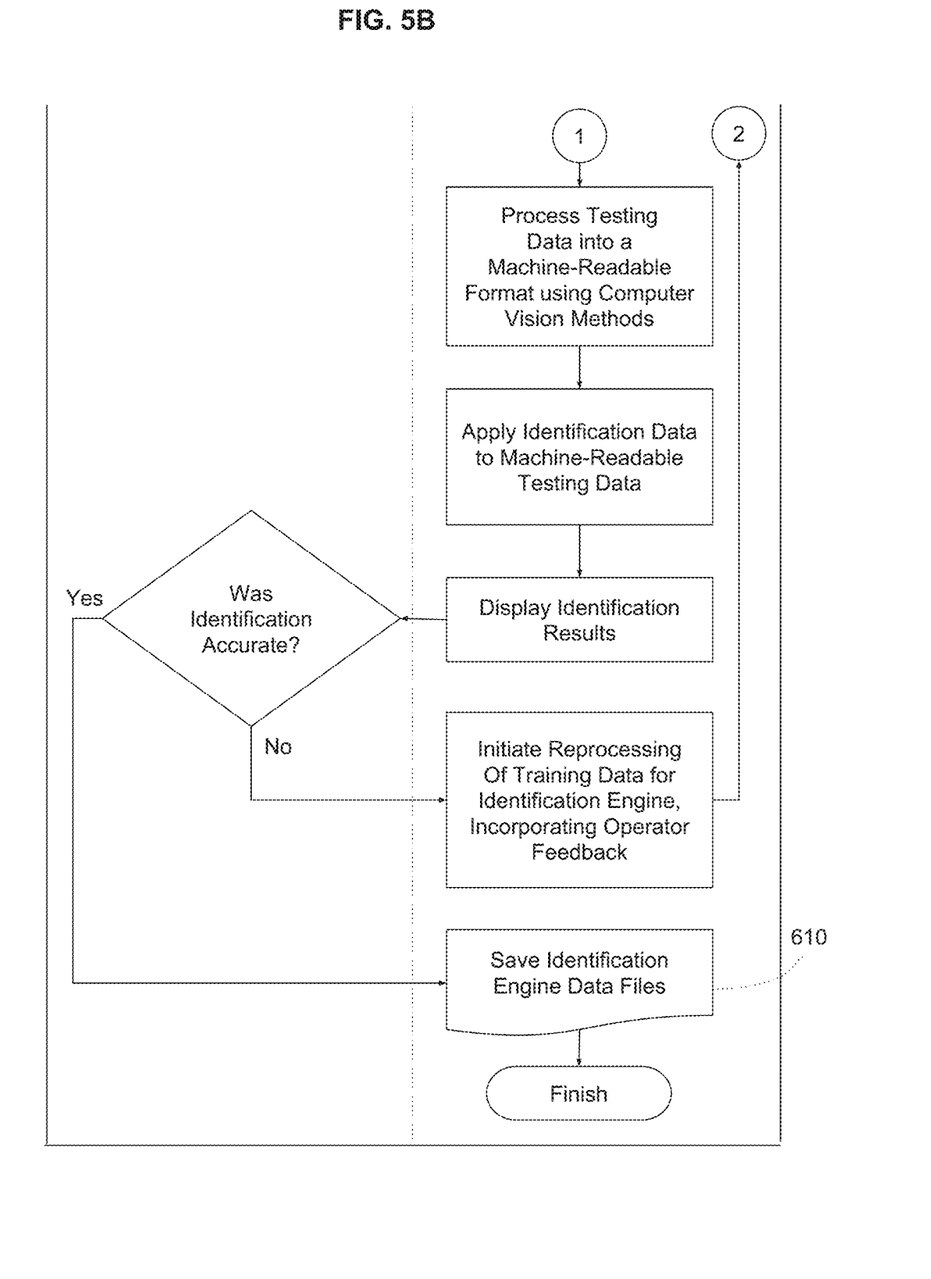

FIGS. 5A and 5B describe a basic protocol of a user training the content identification engine. An Optimization Engine Engineer 550, which is a user in this case, launches the Optimization Engine 520 and subsequent steps include selecting training media files 580, loading and identifying training data files and processing them into a machine-readable format using computer vision methods to produce an Identification Engine Data File 610. Subsequently, a user selects and loads the testing data (media files) and process them into a machine-readable format using a computer vision method. At this stage, the Identification Engine Data File 610 is applied to the machine-readable testing data and identification is matched. If the identification is accurate, the Identification Engine Data File 610 is saved. However, if the ideal level of identification is not achieved, the user reinitiates the Optimization Engine 520 after incorporating Optimization Engine Operator's 550 feedback into the optimization calculations until ideal identification is achieved.

In this embodiment, the system incorporates a content identification engine trained to automatically detect the input category and generate the associated Metadata 580 identifying the input category of the video; said system reads pre-recorded video files and associated Metadata 580 to learn to identify the input category, then when the second user begins capturing their computing session, a detection engine automatically identifies the input category, which is then combined with the user's preset preference to load the correct previously-generated encoding optimization settings.

What is claimed:

1. A system configured to train an artificial intelligence engine to determine an optimal video profile for different video content, the system comprising:
   one or more processors configured by machine-readable instructions to:
   (a) receive, by the artificial intelligence engine, (1) a test set of test video games, (2) test metadata identifying a video game name of each test video game, (3) current encoder settings and (4) a custom encoder preset, the custom encoder preset specifying a desired optimization of at least one of video quality and CPU utilization;
   (b) read the current encoder settings;
   (c) apply the current encoder settings to the test set;
   (d) provide results;
   (e) receive at least one of a video quality rating input and a CPU utilization based on the results;
   (f) revise the current encoder settings;
   (g) repeat steps (c)-(f) until an optimal set of encoder settings for the artificial intelligence engine is determined for each video game name of the test set and at least one of video quality and CPU utilization specified by a corresponding custom encoder preset;
   (h) receive video information that includes visual and/or audio content and video metadata;
   (i) determine a received video game name from the video metadata;
   (j) control the artificial intelligence engine to:
      (1) determine an encoding profile based on the received video game name, the encoding profile specifying the optimal set of encoder settings determined in step (g) for the received video game name and user information of a user computing platform, the user information defining a type of computing platform used to encode the video content and an Internet connection speed of the computing platform;
      (2) encode the video content based on the encoding profile to produce encoded video content; and
      (3) stream the encoded video content along with a user-provided graphical overlay added to the encoded video content.

2. The system of claim 1, wherein the one or more processors are further configured by machine-readable instructions to:
   provide an efficiency profile corresponding to the current encoder settings;
   associate the optimal set of encoder settings and the efficiency profile with the video game name;
   wherein the efficiency profile specifies one or more measurement values;
   effectuate presentation of the efficiency profile based on the one or more measurement values on a computing platform associated with a user and an option to accept the encoding profile;
   obtain acceptance of the encoding profile for encoding the video content; and
   responsive to the acceptance of the encoding profile for encoding the video content being received, provide the computing platform with the encoding profile such that the computing platform is enabled to encode the video content according to the encoding profile;
   determine a minimum efficiency threshold, the minimum efficiency threshold defining a minimum measurement value required for the efficiency profile to be presented to the computing platform;
   determine whether the measurement values of the efficiency profile exceed the minimum efficiency threshold;

responsive to the measurement values of the efficiency profile not exceeding the minimum efficiency threshold, determine different encoding profile to encode the video content; and responsive to the measurement values of the efficiency profile exceeding the minimum efficiency threshold, present the encoding profile associated with the efficiency profile to the computing platform associated with a user and an option to accept the encoding profile such that the computing platform is enabled to encode the video content according to the encoding profile.

3. The system of claim 1 wherein the optimal set of encoder settings is determined to balance video quality and CPU utilization while encoding the video game.

4. The system of claim 1, further comprising machine-readable instructions to:

analyze the video information via computer vision;

identify one of a plurality of listed possible activity types of the video content based on the video game name of the video information; and generate metadata associated with the video information that corresponds to an identified activity type of the video content, wherein the activity type classifies an activity performed in the video content and includes gameplay of a video game;

wherein the activity type specifies an additional level of detail for each category, including one or more genres of a video game input category.

5. The system of claim 1, wherein the determination of the encoding profile for the video content is based on an activity type of the video content.

6. The system of claim 2, wherein the measurement values specify one or more of a bitrate, frame rate, resolution, and/or expected encoding time of the video content encoded according to the encoding profile.

7. The system of claim 1, wherein the one or more processors are further configured by machine-readable instructions to:

identify an encoding profile with a most efficient efficiency profile for a given activity type; and determine an association between individual activity types and individual encoding profiles is based on the efficiency of the efficiency profile, wherein an encoding profile with the most efficient efficiency profile for a given activity type is associated with the activity type.

8. The system of claim 1, wherein a portion of the video content is encoded to determine an efficiency profile of the video content.

9. The system of claim 1, wherein the optimal set of encoder settings for encoding the video content include a first setting defining a frequency in which a pixel from a frame of the video content is carried into the next frame, a second setting defining a resolution, a third setting defining an aspect ratio, a fourth setting defining a frame rate, and/or a fifth setting defining a video coding standard.

10. The system of claim 1, wherein the encoded video content is transmitted to an external device, the external device may be configured to broadcast the encoded video content.

11. A method configured to train an artificial intelligence engine to determine an optimal encoding profile for different video content using an artificial intelligence engine, the method comprising:

(a) receiving, by the artificial intelligence engine, (1) a test set of test video games, (2) test metadata identifying a video game name of each test video game, (3) current encoder settings and (4) a custom encoder preset, the custom encoder preset specifying a desired optimization of at least one of video quality and CPU utilization;

(b) reading the current encoder settings;
(c) applying the current encoder settings to the test set;
(d) providing results;
(e) receiving at least one of a video quality rating input and a CPU utilization based on the results;
(f) revising the current encoder settings;
(g) repeating steps (c)-(f) until an optimal set of encoder settings for the artificial intelligence engine is determined for each video game name of the test set and at least one of video quality and CPU utilization specified by a corresponding custom encoder preset;
(h) receiving video information that includes visual and/or audio content and video metadata;
(i) determining a received video game name from the video metadata;
(j) controlling the artificial intelligence engine to:
(1) determine an encoding profile based on the received video game name, the encoding profile specifying the optimal set of encoder settings determined in step (g) for the received video game name and user information of a user computing platform, the user information defining a type of computing platform used to encode the video content and an Internet connection speed of the computing platform;
(2) encode the video content based on the encoding profile to produce encoded video content; and
(3) stream the encoded video content along with a user-provided graphical overlay added to the encoded video content.

12. The method of claim 11, wherein the method further comprises:

providing an efficiency profile corresponding to the current encoder settings;

associating the optimal set of encoder settings for the artificial intelligence engine and the efficiency profile with the video game name;

wherein the efficiency profile specifies one or more measurement values;

effectuating presentation of the efficiency profile based on the one or more measurement values on a computing platform associated with a user and an option to accept the encoding profile;

determining a minimum efficiency threshold, the minimum efficiency threshold defining a minimum measurement value required for the efficiency profile to be presented to the computing platform;

determining whether the measurement values of the efficiency profile exceed the minimum efficiency threshold;

responsive to the measurement values of the efficiency profile not exceeding the minimum efficiency threshold, determining different encoding profile to encode the video content; and responsive to the measurement values of the efficiency profile exceeding the minimum efficiency threshold, presenting the encoding profile associated with the efficiency profile to the computing platform associated with the user and the option to accept the encoding profile such that the computing platform is enabled to encode the video content according to the encoding profile.

13. The method of claim 12, wherein the measurement values specify one or more of a bitrate, frame rate, resolution, and/or expected encoding time of the video content encoded according to the encoding profile.

14. The method of claim 11, further comprising machine-readable instructions to:
analyze the video information via computer vision;
identify an activity type of the video content based on the video information; and
generate metadata associated with the video information that corresponds to the identified activity type of the video content,
wherein the activity type classifies an activity performed in the video content and includes one or more of gameplay of a video game, a live video broadcast, a replay of a prerecorded video, or an instant messaging chat;
wherein the activity type specifies one or more genre of the video game, one or more genres of the live video broadcast, a service provider of the live video broadcast, one or more genres of the replay of the prerecorded video, and/or a service provider of the instant messaging chat.

15. The method of claim 11, wherein the determination of the encoding profile for the video content is based on an activity type of the video content and user information of a computing platform, the user information defining the type of computing platform used to encode the video content and an Internet connection speed of the computing platform.

16. The method of claim 11, wherein the method further comprises:
identifying an encoding profile with a most efficient efficiency profile for a given activity type; and
determining an association between individual activity types and individual encoding profiles is based on the efficiency of the efficiency profile, wherein an encoding profile with the most efficient efficiency profile for a given activity type is associated with the activity types.

17. The method of claim 11, wherein a portion of the video content is encoded to determine an efficiency profile of the video content.

18. The method of claim 11, wherein the encoded video content is transmitted to an external device, the external device may be configured to broadcast the encoded video content.

19. A non-transitory computer readable medium having stored thereon software instructions that, when executed by a processor, cause the processor to train an optimization engine using an artificial intelligence engine to determine optimal encoding settings for video content, by executing the steps comprising:
(a) receiving, by the artificial intelligence engine, (1) a test set of test video games, (2) test metadata identifying a video game name of each test video game, (3) current encoder settings and (4) a custom encoder preset, the custom encoder preset specifying a desired optimization of video quality and CPU utilization;
(b) reading the current encoder settings;
(c) applying the current encoder settings to the test set;
(d) providing results;
(e) receiving at least one of a video quality rating input and a CPU utilization based on the results;
(f) revising the current encoder settings;
(g) repeating steps (c)-(f) until an optimal set of encoder settings for the artificial intelligence engine is determined for each video game name of the test set and at least one of a video quality and CPU utilization specified by a corresponding custom encoder preset;
(h) receiving video information that includes visual and/or audio content and video metadata;
(i) determining a received video game name from the video metadata;
(j) controlling the artificial intelligence engine to:
(1) determine an encoding profile based on the received video game name, the encoding profile specifying the optimal set of encoder settings determined in step (g) for the received video game name and user information of a user computing platform, the user information defining a type of computing platform used to encode the video content and an Internet connection speed of the computing platform;
(2) encode the video content based on the encoding profile to produce encoded video content; and
(3) stream the encoded video content along with a user-provided graphical overlay added to the encoded video content.

20. The non-transitory computer readable medium of claim 19 wherein the optimal set of encoding settings comprise bitrate, video quality, bandwidth and CPU/GPU utilization.

21. The non-transitory computer readable medium of claim 19 wherein the video quality rating is provided by one of PSNR, SSIM, VMAF or an optimization engine operator.

* * * * *